Jan. 10, 1967 YASUO TATSUTOMI 3,297,240
ROTARY PISTON MOUNTING MECHANISM
Filed April 18, 1966 2 Sheets-Sheet 1

INVENTOR
YASUO TATSUTOMI

BY *Wenderoth, Lind & Ponack*

ATTORNEYS

United States Patent Office 3,297,240
Patented Jan. 10, 1967

3,297,240
ROTARY PISTON MOUNTING MECHANISM
Yasuo Tatsutomi, Aki-gun, Hiroshima-ken, Japan, assignor to Toyo Kogyo Company Limited, Hiroshima-ken, Japan
Filed Apr. 18, 1966, Ser. No. 543,116
Claims priority, application Japan, Apr. 19, 1965, 40/31,261
2 Claims. (Cl. 230—145)

The present invention relates to a rotary piston internal combustion engine and more particularly to an improvement in mounting means forming part of the rotary piston thereof.

Conventional rotary piston internal combustion engines include structure comprising a triangular rotary piston mounted on the crankshaft within a working chamber to rotate with a planetary motion, and the intake, compression and the exhaust strokes are performed by the planetary rotation of the triangular piston around the crankshaft during the rotation of the crankshaft. To accomplish the relative rotation of the rotary piston and the crankshaft, a rotary piston is provided having a flat end face to which an internal gear is secured by conventional bolt means, and around the part of the crankshaft adjacent thereto is an external gear engaged with the internal gear and secured to the engine housing. This internal and external gear means has as its only function the relative rotation of the piston and the crankshaft and theoretically is not subjected to heavy loads. However, during the operation of the engine, due to the bearing clearance at the rotary piston journal on the crankshaft, backlash of the internal and external gears occurs and unbalanced pressure distribution exist in the working chamber, such as in the intake chamber, compression chamber, explosion chamber, etc., and as a result the internal gear and the external gear momentarily receive heavy loads and shock at the point thereof at which they mesh. This causes damage to the meshing gears and requires frequent replacement of the gears.

An object of the present invention is to provide a novel mounting means for the rotary piston in which the rotary piston and the internal gear secured thereto are circumferentially resilient relative to the external gear, thereby permitting damping of the abrupt heavy loads and shocks on the meshing internal and external gears.

Other objects and advantages will become apparent from the following specification and claims, taken in connection with the accompanying drawings in which:

Figure 1:
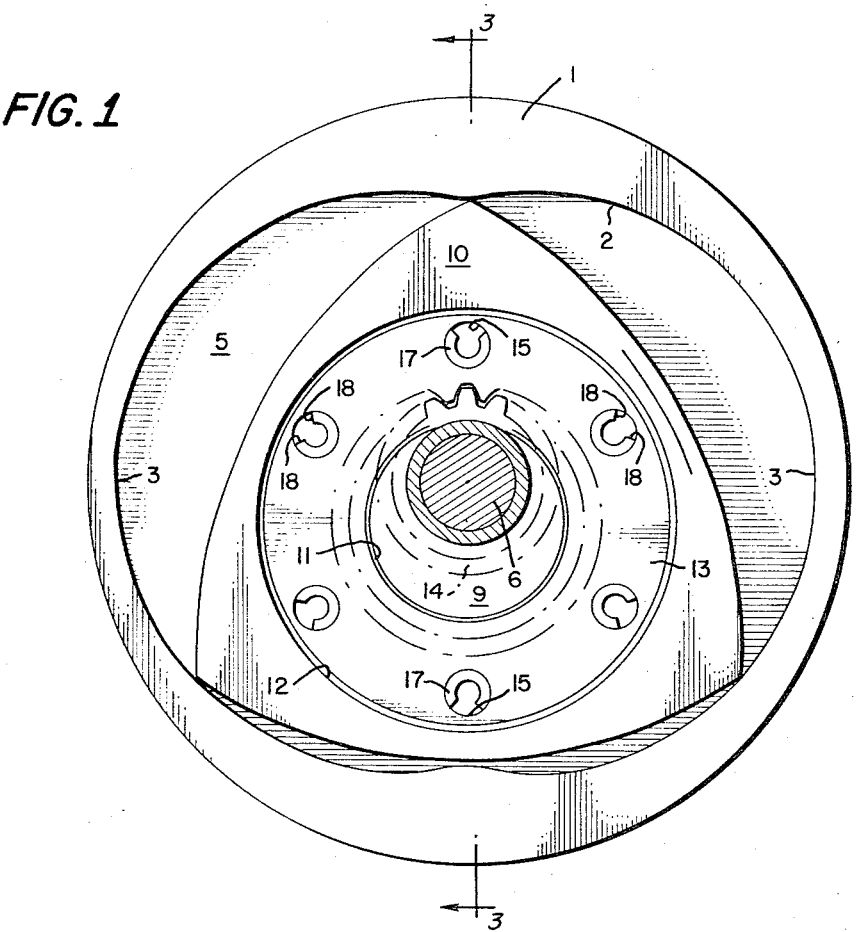
FIG. 1 is an end elevation view, partly in section, of a rotary piston internal combustion engine showing a rotary piston mounted according to the present invention.

In the accompanying drawings, an annular casing 1 having an inner peripheral wall 2 in the shape of an epitrochord having two circumferentially spaced lobes 3 is closed at the opposite ends thereof by a pair of end walls 4 to define a working chamber 5 therein. Extending axially through the center of the working chamber 5 is a crankshaft 6, the shaft portions 7 of which are journaled in the side wall bearing bores 8 in bushings secured in the bores 8. Between the shaft portions 7 of the crankshaft 6 is an eccentric crank portion 9. Positioned within the working chamber is a rotary piston 10 having an axial aperture 11 within which the eccentric crank portion 9 is positioned in a bushing 11a for rotatably mounting the rotary piston 10 in the working chamber so that it will perform planetary motion therein. At appropriate positions in either the annular casing 1 or end wall 4, an intake port, spark plug and exhaust port (not shown) are provided.

Coaxial with the aperture 11 and located in one end face of the rotary piston 10 is a recess 12 within which an internal gear 13 is mounted in the hereinafter described manner. The outside diameter of the internal gear 13 is slightly less than the diameter of the recess 12 so that the gear 13 is rotatable relative to the rotary piston 10. Coaxially with and around one crankshaft portion 7 is an external gear 14 which is secured to the working chamber housing, that is, one of the end walls 4, and which meshes with the internal gear 13. The relative rotation of the rotary piston 10 and the crankshaft 6 depends upon the ratio of the number of teeth in the internal and external gears, and in the embodiment illustrated and described herein the number of teeth on the internal gear 13 and the external gear 14 are in a ratio of 3:2.

Figure 2:
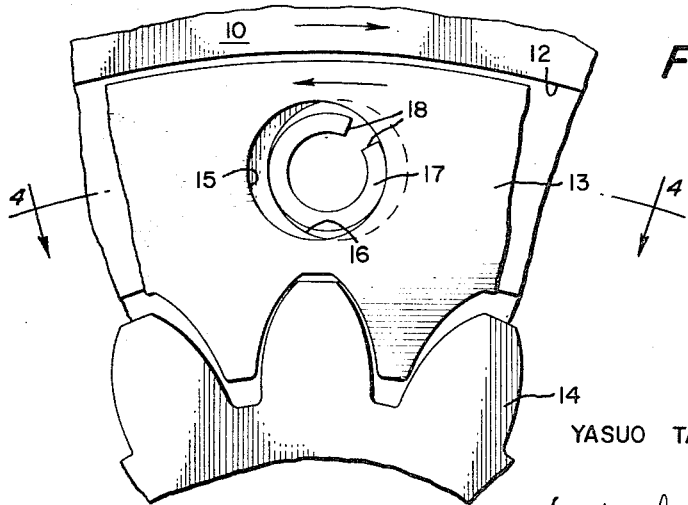
FIG. 2 is an enlarged fragmentary view of a part of FIG. 1.
Figure 3:
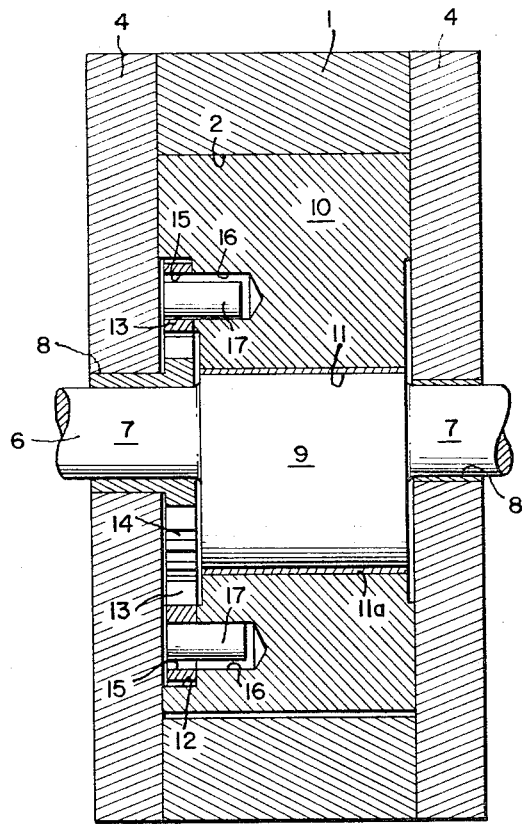
FIG. 3 is a vertical sectional view, taken on line 3—3 of FIG. 1.
Figure 4:
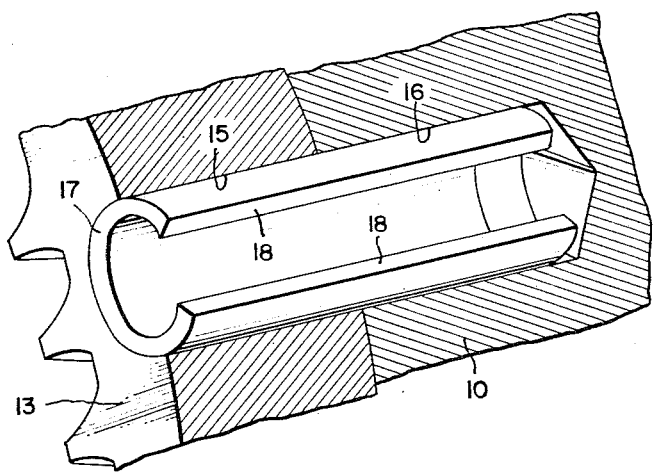
FIG. 4 is a sectional perspective view, taken on line 4—4 of FIG. 2.

Appropriately circumferentially spaced around internal gear 13 and extending therethrough parallel to the axis thereof are securing holes 15, and corresponding holes 16 extend into the rotary piston 10 parallel to the axis thereof. Inserted in each pair of aligned holes 15 and 16 is a longitudinally slotted cylindrical spring pin 17 having longitudinally extending edges 18, 18 spaced from each other so as to leave an axial space therebetween for permitting resilient radial compression of the pin 17 when the holes of a pair of holes move out of alignment, as shown in FIG. 2.

During the time when the internal gear 13 is under no load, each pin 17 is only slightly radially compressed within the holes 15 and 16 and secures the internal gear 13 in the recess 12 by the effect of the radial resilience of the pin, yet leaves sufficient amount of space between the spaced edges 18, 18 to allow further resilient radial compression of the pin. Thus the internal gear 13 is resiliently loaded in the circumferential direction in opposition to a load or shock between the internal and external gears. Assuming that the rotary piston 10 rotates with planetary motion around the external gear 14 with the internal gear 13 engaged with the external gear and performs intake, compression, power and exhaust strokes, repetition of abrupt moment loads and/or shock loads at the point of engagement of the internal and external gears is caused by the series of the rotary piston impulses under the effect of the gas explosions and other loads and shocks due to the piston bearing clearance at the rotary piston journal on the crank portion 9, and the backlash at the point of engagement of the gears 13 and 14 produces corresponding periodic resistance moments in the internal gear 13. In response to these resistance moments, each spring pin 17 carries out repeated radial compression and expansion, and the gear 13 is, in response to the loads and/or shock, permitted to move in the rotational direction in the recess 12 by the amount of radial compression of the spring pin 17 and the expansion thereof, and the loads and/or shocks are thus, by the effect of the resilience of the pin 17, absorbed.

In the inserted and engaged position, the external end faces of the internal gear 13 and the spring pins 17, are close to or slightly spaced from the inner face of the adjacent side wall so that the pins cannot slip out of the holes and disengagement of the gears and pins during the engine operation is prevented. In addition, if required for the safety, appropriate locking means can be provided, for example on the peripheral face of each pin 17 and holes 15 and 16. Also, to insure accurate and efficient operation of the pins 17, surface treatment of the peripheral surfaces of the pins and holes is also suggested.

The diameter, length, radial resilience, etc., of the spring pins 17 will be determined by the actual loads and shocks and other factors involved.

Although only one typical embodiment of the present invention has been illustrated and described, it will be apparent to those skilled in the art that various changes and modifications may be made therein without departing from the scope of the appended claims.

What is claimed is:

1. In a rotary piston internal combustion engine, the combination of an annular casing, a pair of end walls on said casing defining a working chamber therein; a crankshaft having shaft portions and a crank portion and extending through the center of the working chamber and having the shaft portions journaled in said end walls; a rotary piston positioned in the working chamber and eccentrically drivably journaled on the crank portion of the crankshaft; an external gear secured to the inside face of one of the end walls coaxial with the crankshaft portion journaled therein; one end face of the rotary piston having a circular recess therein coaxial with the central axis of the rotary piston; and internal gear rotatably coaxially positioned within the said recess and meshing with the said external gear; said internal gear having a plurality of holes therethrough spaced circumferentially thereof and extending parallel to the axis thereof; said rotary piston having holes therein corresponding to the said holes through said internal gear and extending parallel to the axis thereof; and a plurality of radially resilient cylindrical spring pins, one for each pair of corresponding holes in the internal gear and rotary piston and positioned in the respective pairs of holes for resiliently securing the internal gear to the rotary piston to withstand loads and shocks during the engagement of the internal and external gears.

2. The combination as claimed in claim 1 in which said cylindrical spring pins are longitudinally slotted and have a longitudinally extending space between opposed edges thereof for permitting radial resilient compression and expansion.

References Cited by the Examiner

UNITED STATES PATENTS

| | | | |
|---|---|---|---|
| 2,460,630 | 2/1949 | Fawick | 74—411 |
| 2,702,995 | 3/1955 | Biedess | 74—411 |
| 2,988,065 | 6/1961 | Wankel et al. | 91—56 |
| 3,090,258 | 5/1963 | Zink et al. | 74—411 |
| 3,108,578 | 10/1963 | Scherenberg | 103—130 |
| 3,111,261 | 11/1963 | Bentele et al. | 103—130 |
| 3,155,311 | 11/1964 | Jones | 230—145 |
| 3,206,993 | 9/1965 | Nieman | 74—411 |

FOREIGN PATENTS 1,135,706   8/1962   Germany.

MARK NEWMAN, *Primary Examiner.*

W. J. GOODLIN, *Assistant Examiner.*